No. 632,307. Patented Sept. 5, 1899.
J. L. CLARK.
DETACHABLE COVER FOR COOKING UTENSILS.
(Application filed Dec. 12, 1898.)
(No Model.)
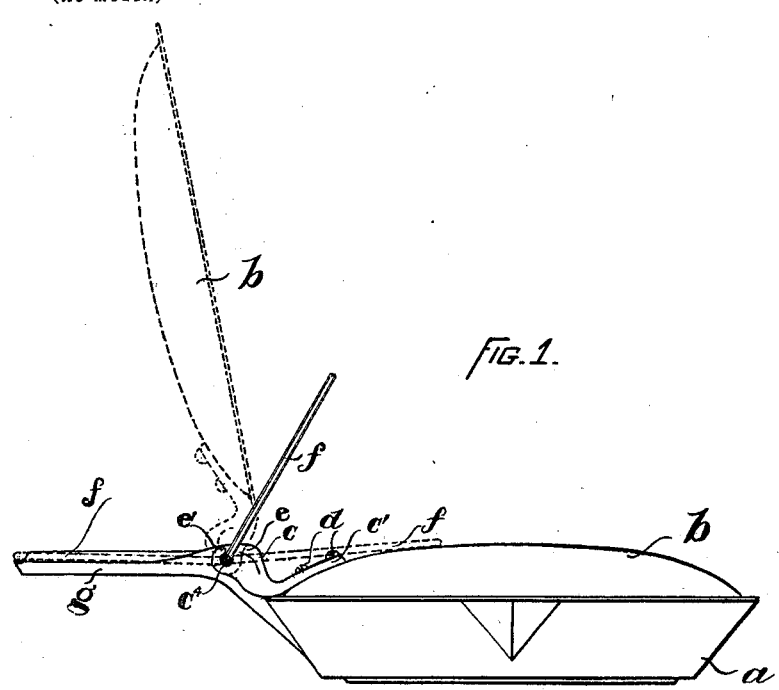
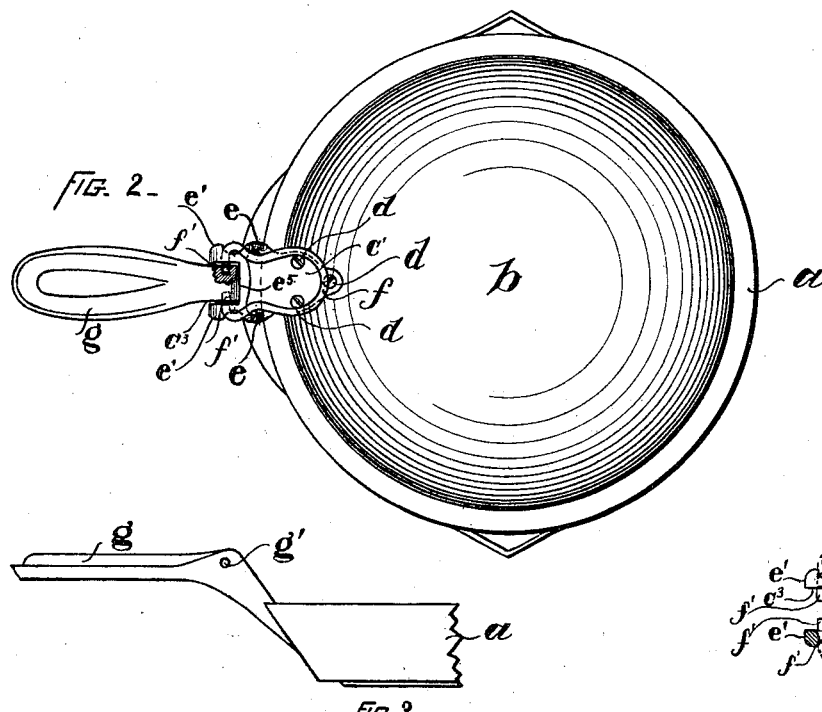
WITNESSES
Ralph F. Pearson
Harry M. Smith
INVENTOR
John L. Clark
by his attorney,
Harry O. Robinson

UNITED STATES PATENT OFFICE.

JOHN L. CLARK, OF BANGOR, MAINE.

DETACHABLE COVER FOR COOKING UTENSILS.

SPECIFICATION forming part of Letters Patent No. 632,307, dated September 5, 1899.

Application filed December 12, 1898. Serial No. 698,955. (No model.)

*To all whom it may concern:*

Be it known that I, JOHN L. CLARK, a citizen of the United States of America, and a resident of Bangor, Penobscot county, State of Maine, have invented certain new and useful Improvements in Detachable Covers for Cooking Utensils, of which the following is a specification.

This invention relates to cooking utensils, and has for its object to provide improved means for attaching or hinging the cover to the utensil whereby said cover may be quickly raised to inspect the contents of the vessel and quickly detached therefrom to be cleaned.

In accordance with this invention the cover of the cooking utensil is provided with a hinge and a spring-acting handle having its lower ends bent to form the pivots for said hinge, and said pivots are normally held in engagement with said cooking utensil by the spring action of said handle. Means is provided to disengage said pivots from said cooking utensil to detach the cover therefrom and shoulders are secured to said hinge engaging said handle to raise said cover on its hinge.

Figure 1 is a side elevation of a cooking utensil—as, for example, a frying-pan—showing the detachable cover. Fig. 2 is a plan view of the part shown in Fig. 1. Fig. 3 is a side elevation of a part of a frying-pan, showing the handle; and Fig. 4 is a plan view of the detachable hinge of the cover, showing the pivots thereof spread apart in dotted lines.

The letter $a$ denotes a cooking utensil, herein shown as a frying-pan, and $b$ the detachable cover therefor. $c$ denotes the detachable hinge pivoting said cover $b$ to said frying-pan $a$, which may be secured to said cover $b$ by screws or rivets $d$, as shown in the drawings, or in any other desirable or suitable way. A lever or handle $f$ for raising said cover $b$ upon its hinge $c$ and for detaching said cover $b$ from said frying-pan $a$ is provided and normally occupies a position at an angle with said cover $b$, as shown in Fig. 1, and said lever or handle $f$ may be made of spring-wire, having its lower ends turned or bent toward each other to form pivots $f'$ for the hinge $c$, upon which said cover $b$ turns, as will be described. Said hinge $c$ is herein shown as consisting of two parts—viz., a plate $c$, secured to said cover $b$, as has been described, and a portion $c^2$, having formed therein a shouldered slot or recess $c^3$, into which a shouldered portion of the handle $g$ of the frying-pan $a$ next the rim thereof projects. Said handle $g$ of the frying-pan has formed therein sockets $g'$, and said portion $c'$ of said hinge $c$ has formed through the sides of said slot $c^3$ holes $c^4$ in alinement with said socket $g'$. To hinge said cover $b$ to said frying-pan $a$, the lower ends of the lever or handle $f$ are passed through said slotted portion $c^3$ of said hinge $c$ and enter said sockets $g'$, formed in said handle $g$ of the frying-pan $a$, as shown in Fig. 2 of the drawings, to act as pivots, upon which said cover $b$ turns. Said portion $c'$ of the hinge $c$ has formed thereon two oppositely-arranged cams or ears $e$, lying in the path of the lever or handle $f$ as it is moved forwardly, the lower ends thereof serving as the pivots on which said handle $f'$ swings, and two shoulders or stops $e'$ are formed in said hinge $c$ and occupy a position directly in the path of said handle $f$ as it swings rearwardly on its pivot. The object of said shoulders or stops $e'$ is to limit the movement of said handle $f$ as it is moved rearwardly or in a direction toward the handle $g$ of the frying-pan $a$, as shown in Fig. 1. Said handle $f$ is thus prevented from turning independent of the cover $b$ and acts as a lever to raise said cover $b$ from the frying-pan $a$ on its hinge $c$. The object of the cams $e$, oppositely arranged and lying in the path of said handle $f$ as it is moved forwardly or in a direction toward the body of the frying-pan $a$, is to engage and spread apart the lower ends of said handle $f$, withdrawing said pivots $f'$, forming the ends of said handle $f$, from the socket $g'$ in the handle $g$ of the frying-pan $a$, when said cover $b$ is free to be removed therefrom, as shown in Figs. 1 and 4.

To pivotally attach or hinge the cover $b$ to the frying-pan $a$, the lever or handle $f$ is pressed forward into a position resting upon said cover $b$, in which position said cover $b$ is placed upon said frying-pan $a$, the cams $e$ spreading apart the lower ends of said handle $f$ and withdrawing said pivots $g'$ from the recess $c^3$, as shown in Figs. 1 and 4. The shouldered portion of the handle $g$ of the frying-pan is introduced into the slotted portion $c^3$ of the hinge $c$. The lever or handle $f$ is next moved into the full-line position shown in Fig. 1, passing over and out of engagement with the cams $e$, the spring action of said handle causing the pivots $f'$ to enter the sockets $g'$ in the handle of the frying-pan $a$, thus hinging the cover $b$ thereto. As the lever or handle of the cover $b$ moves out of engagement with the cams $e$ it comes against the shoulders or stops $e'$, which prevent further backward movement thereof independent of the cover $b$. Said handle $b$ normally rests in a position between said shoulders $e'$ and said cams $e$ in a convenient position to be grasped by the operator to detach the cover $b$ from the frying-pan $a$ or raise it upon its hinge.

To raise the cover from the frying-pan, the lever or handle $f$ is pressed back rearwardly in a direction toward the handle of the frying-pan, when the cover $b$ rises, turning on its hinge, as shown in Fig. 1, until it comes in contact with the handle of the frying-pan, against which it rests, as shown by dotted lines in Fig. 1.

I claim—

1. A detachable cover for a cooking utensil, a handle for said cover having its ends bent to form pivots to hinge said cover to said cooking utensil and oppositely-disposed cams, formed upon said hinge and arranged in the path of said handle to disengage said pivots from said cooking utensil, substantially as described.

2. A detachable cover for a cooking utensil, a hinge pivoting said cover thereto, shoulders formed on said hinge and a handle pivoted to said cooking utensil, constructed and arranged to engage said shoulders to raise said cover, substantially as described.

3. A detachable cover for a cooking utensil, a block secured to said cover engaging the handle of said cooking utensil, sockets formed in said handle, a handle for said cover having its ends bent and passed through said block, entering said sockets to form a hinge for said cover and means for disengaging said pivots from said handle to detach said cover, substantially as described.

4. A detachable cover for a cooking utensil, a spring-acting handle having its ends bent to form pivots normally held in contact with said cooking utensil, by the spring action of said handle and oppositely-disposed cams formed upon said hinge and arranged in the path of said handle to disengage said pivots from said cooking utensil, substantially as described.

Signed by me at Bangor, Penobscot county, Maine, this 8th day of December, 1898.

JOHN L. CLARK.

Witnesses:
   WILLIAM B. PEIRCE,
   HARRY O. ROBINSON.